(12) United States Patent
Watanabe

(10) Patent No.: US 7,163,726 B2
(45) Date of Patent: Jan. 16, 2007

(54) LAMINATE-CONTROLLING LIGHT AUTONOMOUSLY AND WINDOW USING THE SAME

(75) Inventor: Haruo Watanabe, Tokyo (JP)

(73) Assignee: Affinity Co, Ltd., Tokyo (JP)

( * ) Notice: Subject to any disclaimer, the term of this patent is extended or adjusted under 35 U.S.C. 154(b) by 329 days.

(21) Appl. No.: 10/484,171

(22) PCT Filed: Dec. 2, 2003

(86) PCT No.: PCT/JP03/15413

§ 371 (c)(1),
(2), (4) Date: Jan. 20, 2004

(87) PCT Pub. No.: WO2004/104132

PCT Pub. Date: Dec. 2, 2004

(65) Prior Publication Data

US 2006/0057312 A1    Mar. 16, 2006

(30) Foreign Application Priority Data

May 22, 2003  (JP)  ............................. 2003-181864

(51) Int. Cl.
  *B32B 7/02*  (2006.01)
  *C09K 3/00*  (2006.01)
(52) U.S. Cl. ..................... 428/34; 359/288; 428/438; 428/439
(58) Field of Classification Search ................ 359/288; 428/34, 438, 439
See application file for complete search history.

(56) References Cited

U.S. PATENT DOCUMENTS

| 5,615,040 | A | * | 3/1997 | Watanabe | 359/288 |
| 5,891,450 | A | * | 4/1999 | Miyajima et al. | 424/401 |
| 6,590,012 | B1 | * | 7/2003 | Miyabayashi | 523/160 |

FOREIGN PATENT DOCUMENTS

| EP | 538839 | 4/1993 |
| EP | 639450 | 2/1995 |
| GB | 1092450 | 11/1967 |
| JP | 6-135985 | 5/1994 |
| JP | 6-218861 | 8/1994 |
| JP | 7-109447 | 4/1995 |

* cited by examiner

*Primary Examiner*—D. S. Nakarani
(74) *Attorney, Agent, or Firm*—Miller, White, Zelano & Branigan, P.C.

(57) ABSTRACT

There are provided laminated bodies or laminated body-containing windows, which comprise isotropic aqueous solutions obtained by dissolving a water-soluble polysaccharide derivative having nonionic amphipathic functional groups in an aqueous medium composed of water and an amphipathic substance, laminated between plates that are at least partially transparent and allow direct vision of the isotropic aqueous solutions, wherein there are added to the isotropic aqueous solutions in appropriate amounts ultraviolet absorbers comprising nonionic or ionic benzophenone derivatives or benzotriazole derivatives which are highly weather resistant and uniformly dissolve in the isotropic aqueous solutions. The isotropic aqueous solutions are transparent and become opaque upon irradiation with light, and exhibit stable reversible change, in order to provide vastly improved weather resistance to the laminated bodies against exposure to sunlight rays over prolonged periods of time.

18 Claims, 2 Drawing Sheets

LAMINATE-CONTROLLING LIGHT AUTONOMOUSLY AND WINDOW USING THE SAME

TECHNICAL FIELD

The present invention relates to laminated bodies enclosing isotropic aqueous solutions which undergo reversible change between transparency and opacity in response to temperature changes caused by heating with solar energy or the like, as well as to windows which employ them.

BACKGROUND ART

In recent years, light regulating glass capable of controlling penetration of sunlight rays has become a topic of interest for energy conservation, comfort, etc. The present specification will refer mainly to window glass to be used for windows in buildings, automobiles and the like, but the laminated bodies of the invention are widely applicable, with no limitation to windows.

The present inventors focused on the fact that windows are directly exposed to sunlight rays. By effectively utilizing the temperature difference between the presence and absence of solar radiation and between seasons, it became possible to develop revolutionary self-responding light regulating laminated bodies which, when exposed to sunlight rays in the high temperature summer season, naturally become opaque and block the sunlight rays. More specifically, for example, U.S. Pat. No. 5,615,040 (corresponding to Japanese Unexamined Patent Publication HEI No. 6-255016) is cited in Journal of Japan Solar Energy Society, Taiyo Energy, Vol. 27, No. 5 (2001), pp. 14–20. The basic structure of the invention described therein is a laminated body in which an isotropic aqueous solution is sealed between a pair of plates. The isotropic aqueous solution comprises at least a water-soluble polysaccharide derivative, an amphipathic substance and water. The principle depends on a stably reversible temperature-dependent sol-gel phase transition. At low temperature, the molecules are uniformly dissolved to produce an isotropic aqueous solution (sol state), while at high temperature a phase transition occurs as the dissolved molecules aggregate into a flocculated state (gel state). In the gel state, the difference in density between the solvent and the fine aggregates creates opacity due to light scattering, thereby blocking about 80% of light. When the laminated body is used to construct a window, the transparent state is maintained to permit penetration of sunshine when the temperature of the laminated body remains lower in the winter season, while heating by direct sunlight rays during the summer season produces opacity which cuts approximately 80% of the sun's rays, thereby providing an energy-conserving, light-regulating window glass. The laminated body satisfies the following fundamental conditions also listed in the aforementioned document.

1) Phase changes between the transparent and opaque state must be reversible.
2) Reversible changes must be able to be repeated without phase separation.
3) The material must be weather resistant.

This laminated body has already been tested as window glass by the present inventors, but it was found that the weather resistance needed to be further improved for it to be suitable for common use as window glass which is exposed to constant sunlight. The results of actual rooftop exposure testing in a Tokyo district using a laminated body assembled with a satisfactory sealed structure indicated an increase in the initial opacity temperature already within about 3 years, even with 5 mm-thick float glass. The present inventors diligently examined methods of adding ultraviolet absorbers to the isotropic aqueous solution and as a result succeeded in developing a laminated body exhibiting revolutionary high weather resistance having features 1) and 2) above, and adequately satisfying condition 3) above.

Window glass must exhibit high weather resistance for use over long periods of 10 years or more and even 20 or 30 years. It should also be as light and thin as possible for reduced load on building frames and compatibility with window frames, as well as for more advantageous manufacturing, transport, construction and the like. The present inventors had also previously examined methods of imparting glass panels with ultraviolet-blocking functions, but because of problems of such as coloring and weight increase and the need for special working, such methods were not generally suitable. The present inventors therefore conducted more detailed examination focusing on various ultraviolet absorbers in order to vastly improve the weather resistance of the isotropic aqueous solution itself.

Previously, there have existed only written references to the general concept of adding ultraviolet absorbers that dissolve in isotropic aqueous solutions for improved weather resistance (benzophenone derivatives, benzotriazole derivatives, salicylic acid ester derivatives, etc.), as also referred to by the present inventors in the aforementioned document, and the patent document mentions only Sumisorb·110S (2-hydroxy-4-methoxybenzophenone-5-sulfonic acid) by Sumitomo Chemical Co., Ltd. as a water-soluble ultraviolet absorber. We therefore tested two types of laminated bodies, comprising an isotropic aqueous solution containing no ultraviolet absorber or an isotropic aqueous solution containing Sumisorb·110S by Sumitomo Chemical Co., Ltd., by an ultraviolet exposure test as described in the examples, and found that air bubbles were generated in both cases from about 50 hours to 100 hours, producing unrecoverable irregularities.

DISCLOSURE OF THE INVENTION

The present invention has been accomplished with the purpose of overcoming the problems of the prior art described above, and its gist is a laminated body or a laminated body-containing window, which comprises an isotropic aqueous solution obtained by dissolving a water-soluble polysaccharide derivative having a nonionic amphipathic functional group in an aqueous medium composed of water and an amphipathic substance, the solution being laminated between plates that are at least partially transparent and allow direct vision of the isotropic aqueous solution, wherein there is added to the isotropic aqueous solution in an appropriate amount an ultraviolet absorber comprising a nonionic or ionic benzophenone derivative or benzotriazole derivative which is highly weather resistant and uniformly dissolves in the isotropic aqueous solution. It was found that this produces a transparent isotropic aqueous solution which becomes opaque when irradiated with light and exhibits stable reversible change, in order to provide vastly improved weather resistance to laminated bodies when exposed to sunlight rays over prolonged periods of time.

In other words, the invention provides a laminated body which comprises an isotropic aqueous solution obtained by dissolving 100 parts by weight of a water-soluble polysaccharide derivative having a weight-average molecular weight of about 10,000 to about 200,000 and having a nonionic amphipathic functional group, in about 100 to about 2000 parts by weight of an aqueous medium composed of water in an amount of about 25 to about 450 with respect to 100 parts by weight of the polysaccharide derivative and an amphipathic substance with a molecular weight of about 60 to about 5000, laminated between plates that are partially transparent and allow direct vision of the aqueous solution, wherein there is added in an amount of 0.01–10 parts by weight with respect to 100 parts by weight of the isotropic aqueous solution at least one compound selected from the group consisting of nonionic benzophenone derivatives and benzotriazole derivatives having solubility of 1 g or greater in the amphipathic substance at 20° C. and ionic benzophenone derivatives and benzotriazole derivatives with an ionic functional group bonded to the benzene ring via a chain portion and having solubility of 1 g or greater in water at 20° C.

The invention further provides a window containing a laminated body which comprises an isotropic aqueous solution obtained by dissolving 100 parts by weight of a water-soluble polysaccharide derivative having a weight-average molecular weight of about 10,000 to about 200,000 and having a nonionic amphipathic functional group, in about 100 to about 2000 parts by weight of an aqueous medium composed of water in an amount of about 25 to about 450 with respect to 100 parts by weight of the polysaccharide derivative and an amphipathic substance with a molecular weight of about 60 to about 5000, the solution being laminated between plates that are partially transparent and allow direct vision of the aqueous solution, wherein there is added in an amount of 0.01–10 parts by weight with respect to 100 parts by weight of the isotropic aqueous solution at least one compound selected from the group consisting of nonionic benzophenone derivatives and benzotriazole derivatives having solubility of 1 g or greater in the amphipathic substance at 20° C. and ionic benzophenone derivatives and benzotriazole derivatives with an ionic functional group bonded to the benzene ring via a chain portion and having solubility of 1 g or greater in water at 20° C.

BEST MODE FOR CARRYING OUT THE INVENTION

Figure 1:
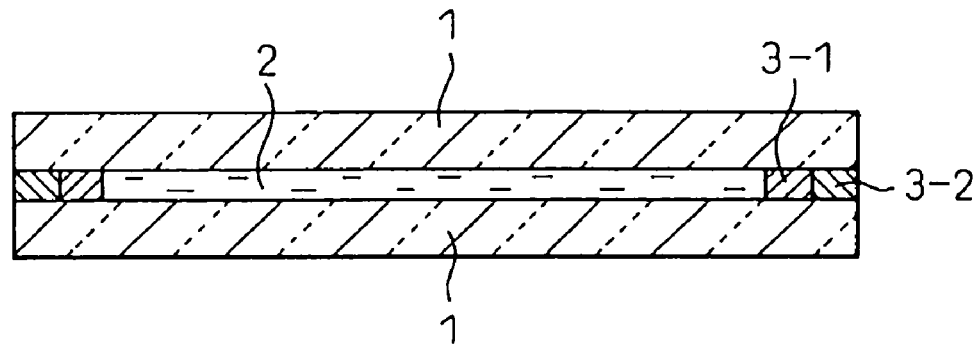
FIG. 1 is a cross-sectional view of an embodiment of a laminated body according to the invention.

As described in the aforementioned patent document, the aqueous solution used for the present invention is an isotropic aqueous solution with a basic composition comprising a water-soluble polysaccharide derivative having an added nonionic amphipathic functional group (hereinafter referred to as "amphipathic polysaccharide derivative"), and an amphipathic substance and water, wherein the solution undergoes a stable reversible change between transparency and opacity based on temperature changes.

The present inventors focused on the fact that amphipathic substances in isotropic aqueous solutions in the presence of water also have solvent action. We selected benzophenone derivatives and benzotriazole derivatives having satisfactory ultraviolet absorption properties and high light stability, and examined in detail the affinity relationship between water, amphipathic substances and amphipathic polysaccharide derivatives. As a result, it was found that benzophenone derivatives and benzotriazole derivatives exist which dissolve uniformly in isotropic aqueous solutions, and a vast improvement in weather resistance of isotropic aqueous solutions was successfully achieved using them. One group of such derivatives are nonionic benzophenone derivatives and benzotriazole derivatives having 20° C. solubility of 1 g or greater and preferably 3 g or greater in amphipathic substances which are liquid at room temperature. Preferred are nonionic benzophenone derivatives and benzotriazole derivatives having 20° C. solubility of 1 g or greater and preferably 3 g or greater in polyoxypropylene trimethylolpropane having a molecular weight of about 400 (hereinafter, TP400).

Another group of such derivatives are ionic benzophenone derivatives and benzotriazole derivatives with an ionic functional group bonded to the benzene ring not directly but rather via a chain portion, and having 20° C. solubility of 1 g or greater and preferably 3 g or group in water, for guaranteed light stability of the ultraviolet absorber itself. Here, a "chain portion" refers to a functional group inserted between the benzene ring and the ionic functional group (for example, methylene, ethylene, ethylene oxide, propylene oxide, ether, ester, etc.). A nonionic benzophenone derivative or benzotriazole derivative may also be used in admixture with an ionic benzophenone derivative or benzotriazole derivative.

Nonionic benzophenone derivatives and benzotriazole derivatives useful for the present invention will now be described. Nonionic benzophenone derivatives and benzotriazole derivatives generally lack affinity with water due to the strong hydrophobicity of the benzene ring, but it was found that benzophenone derivatives and benzotriazole derivatives which dissolve at 1 g or greater in TP400 can stably dissolve in isotropic aqueous solutions due to the solvent effect of TP400 and due to interaction between the amphipathic functional groups of amphipathic polysaccharide derivatives. It was consequently discovered that amphipathic polysaccharide derivatives dissolved in isotropic aqueous solutions are protected from ultraviolet rays and vastly increase the weather resistance of the isotropic aqueous solutions. As one method of preparing an isotropic aqueous solution, a benzophenone derivative or benzotriazole derivative is heated to dissolution in TP400 and then water and, if necessary, additives are added and mixed therewith, and finally an amphipathic polysaccharide derivative is added thereto prior to thorough mixing to obtain a uniform isotropic aqueous solution.

Representative examples of ultraviolet absorbers include 2,2',4,4'-tetrahydroxybenzophenone (hereinafter, UV-106) and 2-(2,4-dihydroxyphenyl)-2H-benzotriazole (hereinafter, UV-7011), which give completely transparent isotropic aqueous solutions. As a typical amphipathic polysaccharide derivative there may be mentioned hydroxypropyl cellulose (hydroxypropyl groups: 62.4%, 2% aqueous solution viscosity: 8.5 cps/20° C., weight-average molecular weight: ~60,000; hereinafter, HPC) and as a typical amphipathic substance there may be mentioned TP400.

According to experiments conducted by the present inventors, adding 6 parts by weight of UV-106 to 100 parts by weight of TP400, heating the mixture to dissolution and returning it to room temperature (20° C.) yielded a completely transparent solution. By adding 87 parts by weight of water to 25 parts by weight of this solution and stirring at room temperature, an opaque state was produced due to separation of the UV-106 (TP400 and water are uniformly miscible at room temperature). Surprisingly, however, when 50 parts by weight of HPC was further added and the mixture was adequately stirred, the opacity totally cleared to give a completely transparent isotropic aqueous solution. The isotropic aqueous solution containing UV-106, when heated, was sufficiently opaque to uniformly block light, and was stably reversible and exhibited high weather resistance. Next, there was prepared a mixture of HPC/TP400/UV-7011/water in a composition of 50/50/1.3/87 parts by weight. Mixing of TP400 and UV-7011, as with UV-106, produced a completely transparent solution which became opaque with addition of water and finally upon addition of HPC produced a completely transparent isotropic aqueous solution. This isotropic aqueous solution as well, when heated, was sufficiently opaque to uniformly block light, and was stably reversible and exhibited high weather resistance.

Considering that the major use of the laminated body of the invention will be in windows, it is preferred to obtain a water-like completely colorless transparent state. A careful examination was therefore conducted in regard to benzophenone derivatives and benzotriazole derivatives which give completely transparent isotropic aqueous solutions. The amount thereof added may be about 0.01 wt % to 10 wt %, and preferably about 0.1 wt % to 5 wt %, in the isotropic aqueous solution. At lower amounts the effect may be insufficient, and at greater amounts no further improvement in weather resistance is produced.

It was discovered that in order for nonionic benzophenone derivatives to mix with isotropic aqueous solutions in a water-like completely transparent state, it is extremely important for them to have hydrophilic functional groups such as hydroxyl groups, represented as $R_3$–$R_{10}$, in addition to the hydroxyl groups represented by $R_1$ or $R_2$ which contribute to intramolecular hydrogen bonding, as shown in general formula 1 below, so that the benzophenone derivatives exhibit higher affinity for water, amphipathic substances and amphipathic polysaccharide derivatives and the interaction between all of the dissolved substances is in a satisfactory hydrophilic-hydrophobic balance, to thereby obtain a stably reversible and water-like transparent isotropic aqueous solution. This may be accomplished, for example, by adding functional groups such as hydroxyl, polyglycerin, polyethylene oxide or sugar residues.

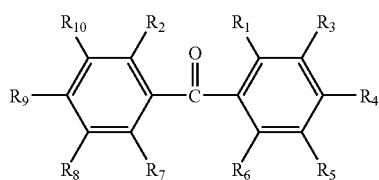

1

Specifically, $R_1$ and $R_2$ in general formula 1 each represent hydrogen or hydroxyl, with at least one of $R_1$ and $R_2$ being hydroxyl, and $R_3$–$R_{10}$ each represent hydrogen, $C_{1-4}$ alkyl (for example, methyl, ethyl, etc.), $C_{1-4}$ alkoxy (for example, methoxy, ethoxy, etc.), hydroxyl, polyglycerin, polyethylene oxide (for example, Japanese Unexamined Patent Publication HEI No. 7-109447) or O—$(R_{11})_n$-A (where A represents an unprotected sugar residue (a residue lacking one hydroxyl group from, for example, a monosaccharide such as glucose or galactose, a disaccharide such as trehalose or maltose or a trisaccharide such as maltotriose), and $R_{11}$ represents a direct bond (n=0), $C_{1-4}$ alkylene or $C_{1-4}$ alkyleneoxide (where n is an integer of 1 to 6)) (for example, Japanese Unexamined Patent Publication HEI No. 6-87879, Japanese Unexamined Patent Publication HEI No. 6-135985), with at least one from among $R_3$ to $R_{10}$ being hydroxyl, polyglycerin, polyethylene oxide or O—$(R_{11})_n$-A.

Preferably, no more than one of the hydroxyl groups of $R_3$ to $R_{10}$ is present on each benzene ring in order to prevent yellowing, and specifically such compounds include, for example, 2,4-dihydroxybenzophenone, 2,4,4'-trihydroxybenzophenone, 2,2',4-trihydroxybenzophenone, UV-106 and 2,4-dihydroxy-4'-methoxybenzophenone. Polyethylene oxide groups increase the number of ethylene oxide units while resulting in greater affinity, and they may be present in a number of 2–100 and preferably about 5–30; specifically such compounds include, for example, 2-hydroxy-4-polyethyleneoxide benzophenone and 2-hydroxy-4-polyethyleneoxide-4'-methoxybenzophenone. Compounds of general formula 1 above include, for example, compounds represented by general formula 2 below.

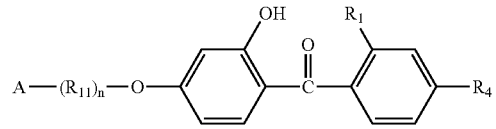

2

(wherein $R_1$ and $R_4$ each represent hydrogen, hydroxyl or $C_{1-4}$ alkoxy, A represents a glucose residue, trehalose residue or maltose residue, $R_{11}$ represents $C_{1-4}$ alkylene or $C_{1-4}$ alkyleneoxide, n is 1 or 2, and from the standpoint of water-solubility and industrial properties, preferably the alkoxy group is methoxy or ethoxy, the alkylene group is methylene or ethylene and the alkyleneoxide group is ethyneoxide or propyne oxide).

It was also discovered that in order for nonionic benzotriazole derivatives to mix with isotropic aqueous solutions in a water-like transparent state, it is extremely important for them to have hydrophilic functional groups such as hydroxyl groups, represented as $R_3$–$R_6$, in addition to the hydroxyl group represented by $R_1$ which contributes to intramolecular hydrogen bonding, as shown in general formula 3 below, so that the benzotriazole derivatives exhibit higher affinity for water, amphipathic substances and amphipathic polysaccharide derivatives and the interaction between all of the dissolved substances is in a satisfactory hydrophilic-hydrophobic balance, to thereby obtain a stably reversible and water-like transparent isotropic aqueous solution. This may be accomplished, for example, by adding functional groups such as hydroxyl, polyglycerin, polyethylene oxide or sugar residues.

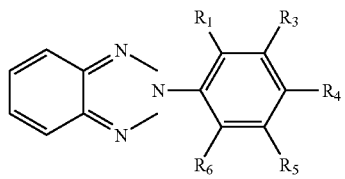

Specifically, $R_1$ in general formula 3 represents hydroxyl, and $R_3$–$R_6$ each represent hydrogen, $C_{1-4}$ alkyl, $C_{1-4}$ alkoxy, hydroxyl, polyglycerin, polyethylene oxide or O—$(R_{11})_n$-A (where A represents an unprotected sugar residue (a residue lacking one hydroxyl group from, for example, a monosaccharide such as glucose or galactose, a disaccharide such as trehalose or maltose or a trisaccharide such as maltotriose), and $R_{11}$ represents a direct bond (n=0), $C_{1-4}$ alkylene or $C_{1-4}$ alkyleneoxide (where n is an integer of 1 to 6)), with at least one from among $R_3$ to $R_6$ being hydroxyl, polyglycerin, polyethylene oxide or O—$(R_{11})_n$-A.

Preferably only one of the hydroxyl groups of $R_3$ to $R_6$ is present in order to prevent yellowing, and specifically such compounds include, for example, 2-(2,4-dihydroxyphenyl)-2H-benzotriazole and the like. Polyethylene oxide groups increase the number of ethylene oxide units while resulting in greater affinity, and they may be present in a number of 2–100 and preferably about 3–30; specifically such compounds include, for example, 2-(2,4-dihydroxyphenyl)-2H-benzotriazole having polyethylene oxide added to the 4-position hydroxyl group. The group O—$(R_{11})_n$-A may be the same as mentioned above for benzophenone derivatives. In addition, halogens such as chlorine or $C_{1-4}$ alkyl groups may be added to the benzene ring of the benzotriazole, although no special effect according to the invention is obtained.

Ionic benzophenone derivatives and benzotriazole derivatives will now be described. According to experiments conducted by the present inventors, benzophenone derivatives and benzotriazole derivatives having ionic functional groups directly bonded to the benzene ring produced water-like transparent isotropic aqueous solutions, but such ultraviolet absorbers exhibited inferior light stability, and photodegradation of the ultraviolet absorbers caused the isotropic aqueous solutions to generate air bubbles and undergo severe yellowing, rendering them unsuitable for use. As a result of further diligent examination it was found that ionic benzophenone derivatives and benzotriazole derivatives which have the ionic functional groups bonded to the benzene via chain portions and which dissolve in water yield water-like transparent isotropic aqueous solutions which are stably reversible and exhibit high weather resistance. Such ionic functional groups include, for example, sulfonic acid groups, carboxylic acid groups, phosphoric acid groups and ammonium groups. The solubility in water at 20° C. may be 1 g or greater and preferably 3 g or greater.

Specifically, these are compounds wherein $R_1$ and $R_2$ in general formula 1 each represent hydrogen or hydroxyl, with at least one of $R_1$ and $R_2$ being hydroxyl, and $R_3$–$R_{10}$ each represent hydrogen, $C_{1-4}$ alkyl (for example, methyl, ethyl, etc.), $C_{1-4}$ alkoxy (for example, methoxy, ethoxy, etc.), or an ionic functional group with a chain portion, with at least one from among $R_3$ to $R_{10}$, being an ionic functional hydroxyl group with a chain portion. Such ionic functional groups undergo ionic dissociation after their addition to isotropic aqueous solutions, and the pH of the isotropic aqueous solutions may be 5–9 and preferably 6–8. The chain portion may be introduced via the hydroxyl groups of $R_3$ to $R_{10}$ and for example, ethylene oxide groups are useful.

Specifically, ionic ultraviolet absorbers may be obtained, for example, by reactions for modification of the 4-position hydroxyl group, as a publicly known method widely used for synthesis of ultraviolet absorbers, surfactants and the like, and the following Compound Nos. 1–6 may be mentioned as examples, where "n" is not particularly restricted but is preferably about 1 to 6.

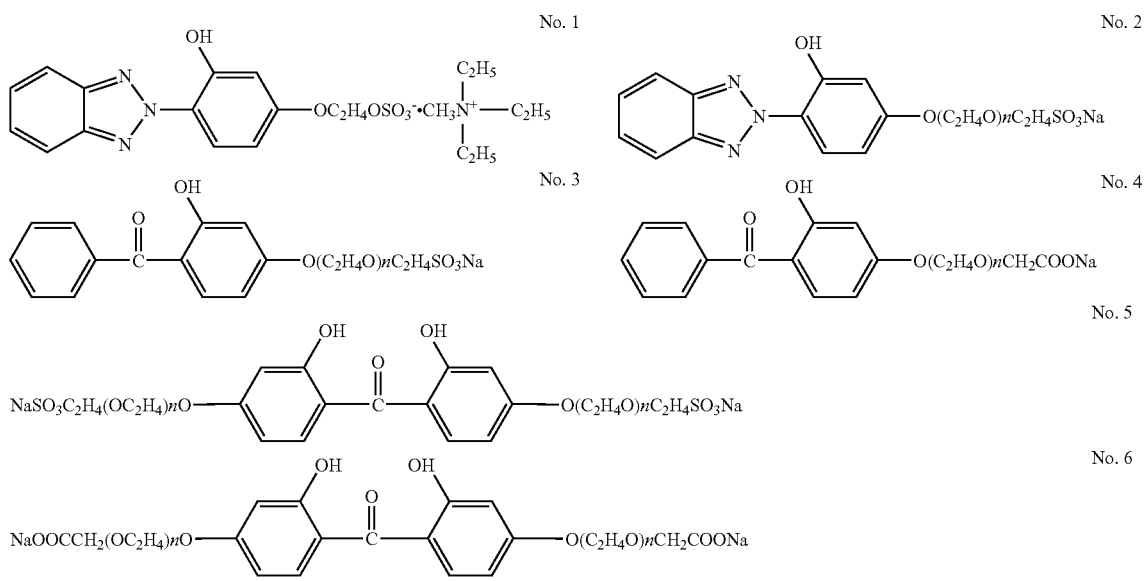

Compound No. 1 (benzotriazole derivative, soluble in water at 20° C.: 3.6 g) will be explained as a concrete example. Compound No. 1 was added at 1.3 parts by weight to 87 parts by weight of water, heated to dissolution and returned to room temperature (20° C.) to obtain a transparent aqueous solution. To this aqueous solution there were added in order 25 parts by weight of TP400 and 50 parts by weight of HPC, and the mixture was subsequently stirred to obtain a water-like transparent uniform isotropic aqueous solution. The isotropic aqueous solution, when heated, had sufficient opacity to uniformly block light, and the state was stably reversible with high weather resistance exhibited.

The amphipathic polysaccharide derivatives and amphipathic substances useful for the present invention will now be explained, as is also explained in detail in the aforementioned patent document. As amphipathic polysaccharide derivatives there may be mentioned polysaccharides (for example, cellulose, pullulan, dextran, etc.) having added nonionic functional groups (for example, hydroxypropyl, etc.), which dissolve uniformly to high concentrations of about 25 to about 50 wt % in water at room temperature to form aqueous solutions, and produce an opaque state as the temperature increases due to the hydrophobic bonding effect. Among these, cellulose derivatives are important for their high stability. The following description will focus mainly on cellulose derivatives, unless otherwise specified, with the understanding that the invention is not limited thereto. A smaller weight-average molecular weight of the amphipathic polysaccharide derivative results in less aggregation and weaker opacity, while a larger weight-average molecular weight causes too much aggregation and phase separation, due to the polymer effect, and therefore neither situation is suitable. Consequently, the weight-average molecular weight of the amphipathic polysaccharide derivative may be in the range of about 10,000 to about 200,000 and preferably in the range of about 15,000 to about 100,000. In the following description, hydroxypropyl has been selected as an example of the functional group added to the cellulose and therefore the focus will be on hydroxypropyl cellulose, but with the understanding that the invention is not limited thereto.

The concentration of the amphipathic polysaccharide derivative of the invention does not need to be particularly high, because if it is too high the hydrophobic bonding effect may be insufficient and even if phase separation does not occur, the opaque light-blocking effect may be weaker, the viscosity may be too high and it may be difficult to accomplish lamination without air bubbles; the concentration of the amphipathic polysaccharide derivative is therefore preferably no greater than about 50% with respect to the water. However, it was discovered that if an aqueous medium (a water/amphipathic substance mixture) is selected as a solvent, even with a composition of, for example, 75 wt % HPC (with the remaining 25 wt % a 5 wt % aqueous sodium chloride solution), and an amphipathic substance such as TP400, for example, is added as a solvent to a proportion of HPC of approximately 30 wt % with respect to the total, an opaque change occurs at about 67° C. If the solvent action of the amphipathic substance is utilized in this manner, the concentration (the proportion of the amphipathic polysaccharide derivative with respect to the water) is not limited to below about 50 wt %. From the standpoint of practical utility, production is facilitated by minimizing the overall proportion of the amphipathic polysaccharide derivative to achieve a lower viscosity. Thus, from the viewpoint of opaque aggregation and reversible stability, the amount of water (which may also include a temperature shifting agent) may be from about 25 to about 450 parts by weight and preferably from about 50 to about 300 parts by weight to 100 parts by weight of the amphipathic polysaccharide derivative.

The amphipathic substance acts to prevent phase separation when the isotropic aqueous solution of the amphipathic polysaccharide derivative undergoes opaque aggregation. Even with addition of the amphipathic substance, however, separation of the water will tend to occur if the concentration of the amphipathic polysaccharide derivative with respect to the water is about 18 wt % or below and more definitely about 25 wt % or below.

The amphipathic substance is a compound having both a hydrophilic group and a hydrophobic group, and either dissolving or uniformly dispersing in water at room temperature. Hydrophilic groups include, for example, hydroxyl, ethylene oxide, ether bonds, ester bonds, amide bonds and the like. Hydrophobic groups include, for example, lower aliphatic groups such as $C_{1-4}$ alkyl groups, and when the hydrophilic group is large, such as polyethylene oxide or an ionic group (for example, sulfonic acid, carboxyl, phosphoric acid, an amphoteric group, etc.), the functional group may include a large hydrophobic group such as a $C_{5-25}$ large aliphatic group, or an aromatic benzene group, benzyl group, phenol group or the like. If the molecular weight of the amphipathic substance is too large, the polymer effect will tend to result in irreversible change and lack of uniformity, while large molecular weights do not necessarily exhibit excellent effects and instead may increase the viscosity of the isotropic aqueous solution and impair its workability. The molecular weight is therefore limited to no greater than the oligomer range of about 5000, and is preferably no greater than about 3000. If the molecular weight is too small the effect will tend to be reduced, and it is therefore at least about 60.

Specific examples of amphipathic substances include 2-ethyl-2-(hydroxymethyl)-1,3-propanediol, 2,3,4-pentanetriol, diethyleneglycol monobutyl ether, diethyleneglycol monobenzyl ether, dipropyleneglycol monomethyl ether, tripropyleneglycol monomethyl ether, polyoxypropylene methylglucoside (for example, GlucamP10 by Union Carbide), bisphenol A comprising ethylene oxide groups with a hydroxyl value of about 100 to about 300, phenylglycol comprising ethylene oxide groups with a hydroxyl value of about 100 to about 350, polyoxypropylene trimethylolpropane with an average molecular weight of about 300 to about 800, poly(oxyethylene/oxypropylene) trimethylolpropane with an average molecular weight of about 500 to about 5000 wherein each unit proportion is approximately 50 wt %, polyoxypropylenesorbitol with an average molecular weight of about 500 to about 3000, ethylene oxide-added polyether-modified silicone oil, sodium dodecylbenzenesulfonate, coconut oil fatty acid amide propylbetaine, and the like.

The amount of the amphipathic substance may be about 0.5 to about 800 parts by weight and preferably about 3 to about 600 parts by weight to 100 parts by weight of water in the isotropic aqueous solution. Two or more different amphipathic substances may also be used in admixture. A colorless transparent isotropic aqueous solution can still be obtained by increasing the amount of amphipathic substance added even if the amount of water is not greater than 100 parts by weight to 100 parts by weight of the amphipathic polysaccharide derivative. This is attributed to the action of the amphipathic substance as a solvent. Thus, the amount of the aqueous medium comprising water, the amphipathic substance and a temperature shifting agent may be from about 100 to about 2000 parts by weight and preferably from about 150 to about 1800 parts by weight, based on 100 parts by weight of the amphipathic polysaccharide derivative.

The initial temperature at which the molecules aggregate to produce opacity can be controlled by changing the type and amount of temperature shifting agent, the composition of the aqueous medium (the mixing proportion of water and amphipathic substance(s)), the proportion of the amphipathic polysaccharide derivative and aqueous medium and the type and amount of amphipathic substance(s). Examples of temperature shifting agents include ionic substances such as lithium chloride, sodium chloride, magnesium chloride, calcium chloride, aluminum chloride, sodium sulfate, 2-phenylphenol sodium and carboxymethylcellulose, or nonionic substances such as phenyl monoglycol, phenyl-1,4-diglycol, benzyl monoglycol, phenylpropylene glycol and 4,4'-dihydroxyphenyl ether, of which any two or more may also be used in admixture. The amount thereof added is not particularly restricted, but may be up to 15 wt % and preferably no greater than 10 wt % with respect to the isotropic aqueous solution. The initial opacity temperature can also be changed by adjusting the amount of ultraviolet absorber added. For example, the initial opacity temperature was shifted lower by increasing the addition of UV-106 mentioned above. Appropriate amounts of preservatives, antimicrobial agents, pigments, heat absorbers, antioxidants and the like may also be added as necessary.

Figure 2:
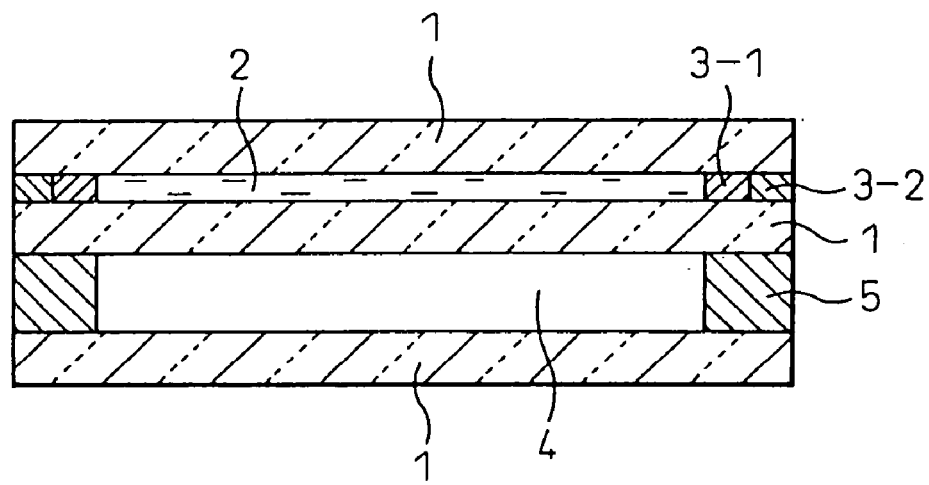
FIG. 2 is a cross-sectional view of an embodiment of a laminated body of the invention having a gas layer additionally situated therein.
Figure 3:
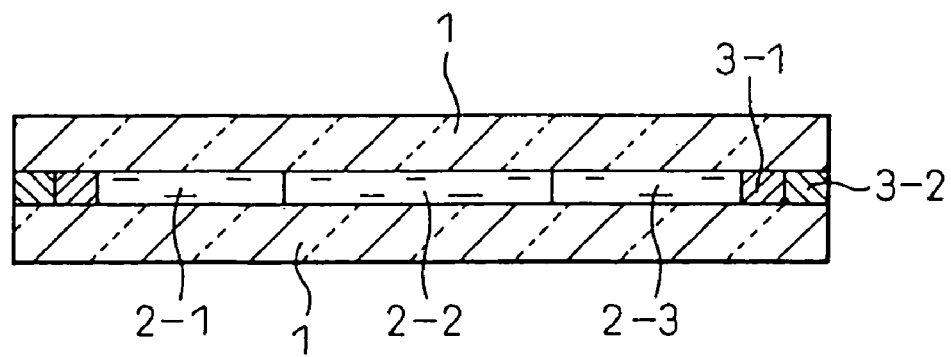
FIG. 3 is a cross-sectional view of an embodiment of a laminated body of the invention having isotropic aqueous solution layers with different compositions.

The structure of the laminated body of the invention will now be explained. FIG. 1, FIG. 2 and FIG. 3 are each cross-sectional views of embodiments of a laminated body according to the invention, wherein 1 is a substrate, 2 is an isotropic aqueous solution, 3-1 and 3-2 are sealants, 4 is an air layer and 5 is an air layer seal.

FIG. 1 shows the basic mode of the laminated body of the invention, comprising an isotropic aqueous solution 2 laminated between substrates 1 which are at least partially transparent and permit direct vision of the isotropic aqueous solution 2. The layer thickness of the isotropic aqueous solution 2 is not particularly restricted and may be about 0.01–2 mm. While not shown in the drawing, there may also be positioned a spacer (for example, glass beads, glass fiber, metal wire, dotted silicone rubber, string-like silicone rubber, etc.) between the isotropic aqueous solution 2 and the sealants 3-1, 3-2. The sealants 3 consist of a water permeation-preventing layer 3-1 and an adhesive fixing layer 3-2 between the substrates. A hot-melt type polyisobutylene-based sealant, for example, is useful for the water permeation-preventing layer 3-1, wherein the main resin component is polyisobutylene and there are selected for admixture therewith resins such as butyl rubber, petroleum-based hydrogenated resin or polybutene and fillers, ultraviolet absorbers and the like such as carbon fine powder, talc fine powder or silica fine powder. The properties allow extrusion working into a string-like form, and ready deformation under approximately atmospheric pressure for bonding to the substrates. If it is too hard, string-like extrusion working may be hampered, while if it is too soft the string lines may cause flow deformation during assembly of the laminated body, resulting in an adverse influence on the thermal stability of the laminated body. Specifically, the penetration may be 15–80 mm and preferably 20–50 mm at 20° C. using a Model AP-II Penetration Tester by Yoshida Kagaku Kiki (Specifications: JIS K2207, ASTM D5).

The adhesive fixing layer 3-2 may be a one-solution type silicone-based sealant, a two-solution type silicone-based sealant, a two-solution type polysulfite-based sealant, a two-solution type isobutylene-based sealant, a two-solution urethane-based sealant, or the like. The performance is that of a thixotropic, highly viscous body which adhesively solidifies onto the substrates upon hardening when allowed to stand at room temperature. The adhesive fixing layer 3-2 preferably has high-modulus rubber elasticity, and it may also employ a double glass sealant (for example, SE9500 by Toray/Down Corning Silicone). The water permeation-preventing layer 3-1 and the adhesive fixing layer 3-2 may also be formed in stages if necessary. This can increase the bonding stability of the water permeation-preventing layer 3-1 and is preferred for use in harsh environments.

Any material resistant to moisture permeation may generally be used for the substrates 1. Examples include glass panels, ceramic panels, metal plates, plastic panels, plastic films and the like, with glass including any of the various commercially available glass materials. Combinations of such materials may also be used for curved sections. The laminated body of the invention also encompasses special shapes, such as rods obtained by injecting the isotropic aqueous solution into tubes, which are arranged in a planar form similar to bamboo. Irregularities may also be formed in the substrates to vary the layer thickness of the isotropic aqueous solution 2 in order to form a raised pattern.

FIG. 2 shows the laminated body of FIG. 1 having an additional substrate 1 provided and a gas layer 4 (such as an air layer) additionally situated therein. This results in a high-performance window or wall material having a heat insulating property in addition to the reversibly changing sunlight-blocking property. When used as a window, the opaque light-blocking property of the isotropic aqueous solution 2 in the summer season reduces the need for indoor cooling while the lack of opacity in the winter season allows transmission of sunlight similar to conventional glass and the gas layer 4 exhibits a heat insulating effect similar to conventional double glass, thereby reducing the need for indoor heating. If the additional substrate is a tile board, the opaque change in the summer season will cause reflection of sunlight to prevent temperature increase on the wall surface, while the heat of sunlight in the winter season will heat the tile wall surface and thus, in combination with the heat insulating property of the air layer 4, the exterior tiling will provide an effect for energy savings.

FIG. 3 shows a laminated body of the invention having isotropic aqueous solution layers 2-1, 2-2 and 2-3 with different properties enclosed between the same substrates. For example, if the isotropic aqueous solution 2 layer is separated into three sections with initial opacity temperatures of about 30° C., about 35° C. and about 40° C. from the top, the opacity of the window will be initiated from the top and the region of opacity will enlarge with increasing seasonal temperature, to thus exhibit a superior sunlight-blocking effect. The layers may also be situated as lines or in a grid fashion to produce a window exhibiting a pattern while simultaneously ensuring partial visibility. Even more intricate separation can produce a continuous gradient change. A combination of an inorganic salt (such as sodium chloride, calcium chloride or the like) and an organic substance (such as phenylmonoglycol, carboxymethyl cellulose or the like) may also be used as the temperature shifting agent. Water-immiscible highly viscous substances (such as silicone oil or the like) and gel substances (such as silicone gel or the like) may be included instead of, for example, the isotropic aqueous solution 2-1, to produce a window with constant visibility. If necessary, string-like sealants such as used in the water permeation-preventing layer 3-1 of FIG. 1 may also be provided as separators between the isotropic aqueous solutions 2-1, 2-2 and 2-3, although this is not shown in the drawing. The separators may also be reinforced by addition of reinforcing materials such as rod-shaped metal, plastic or the like to also serve as spacers. Rod-shaped reinforcing materials containing silicone-based binders or adhesives may also be used. This can yield laminated bodies having the isotropic aqueous solutions clearly compartmentalized.

The laminated body of the invention may be widely utilized for building materials such as window glass, atriums, skylight windows, visors, doors, tiles and the like, as well as for articles for outdoor use, display sites such as advertisement columns, bulletin boards and the like, and for tables, lighting fixtures, furniture, housing installations, miscellaneous household goods, temperature display thermometer panels and the like. It is particularly useful for windows, including windows used in construction of houses, buildings, shops, public structures and the like, and windows for transportation vehicles such as automobiles, trains, ships, aircraft, elevators and the like. Needless to mention, laminated bodies according to the invention can also serve as windows for constant blocking of ultraviolet rays which can cause deterioration such as discoloration of indoor articles. When used on wall surfaces, the wall surfaces will change depending on the atmospheric conditions at the time. For example, laminated bodies with different initial opacity temperatures may be arranged in a matrix fashion to form characters, images or patterns, in order to provide new advertisement media and guide boards which naturally undergo reversible change depending on the presence or absence of sunlight rays or on atmospheric changes.

The present invention will now be explained in greater detail through the following examples.

In the examples described below, primarily HPC is used as the amphipathic polysaccharide derivative and TP400 as the amphipathic substance, but the invention is not limited to these examples. In the case of nonionic benzophenone derivatives and benzotriazole derivatives, the isotropic aqueous solutions were produced by dissolution in the amphipathic substance followed by addition of the aqueous medium and mixing, addition of the HPC and finally adequate mixing and stirring. In the case of ionic benzophenone derivatives and benzotriazole derivatives, preparation was by dissolution in water followed by addition of the amphipathic substance and HPC in that order and stirring. By using multiple amphipathic substances as necessary, it was possible to uniformly dissolve more of the benzophenone derivative and benzotriazole derivatives in the isotropic aqueous solutions. For fabrication of the laminated bodies, 2 mm-thick and 5 mm-thick float glass at a size of 10 cm×10 cm were used as the substrates 1, approximately 4 g of the isotropic aqueous solution 2 was situated between them in the center, and a 2.5 mm-diameter string-like isobutylene sealant 3-1 and room temperature-reactive two-solution silicone sealant 3-2 were set around the periphery before pressure bonding the two substrates in a vacuum, to fabricate a laminated body containing an isotropic aqueous solution free of air bubbles and having a thickness of about 0.5 mm. The laminated bodies of the examples described below were light/weather resistant and exhibited stable and uniform reversible change. Satisfactory results were of course obtained in an ultraviolet resistance test, in a heat resistance test at 60° C. for 5000 hours and in a cycle test with 200 cycles from −20° C. to 70° C.

The ultraviolet irradiation test for weather resistance testing was conducted using an Eye Super UV Tester for ultra-accelerated weather resistance testing by Iwasaki Electric Co., Ltd., at an intensity of 100 mW/cm$^2$ with continuous irradiation from the 5 mm-thick substrate side at a black panel temperature of 63° C., and observation was made visually (hereinafter this will be referred to as the "UV test"). The transmittance was measured using a U-4000 spectrophotometer by Hitachi Laboratories, which is suitable for measurement of scattered light, with a 2 mm-thick plate at the photodetection end. The transmittances were measured at a wavelength of 500 nm, the transparent or semi-transparent states being measured at room temperature (hereinafter, "RT"), and the opaque states being measured after sufficient heating for saturated opacity (hereinafter, "HT"). The amounts listed below all signify parts by weight.

EXAMPLE 1

Figure 4:
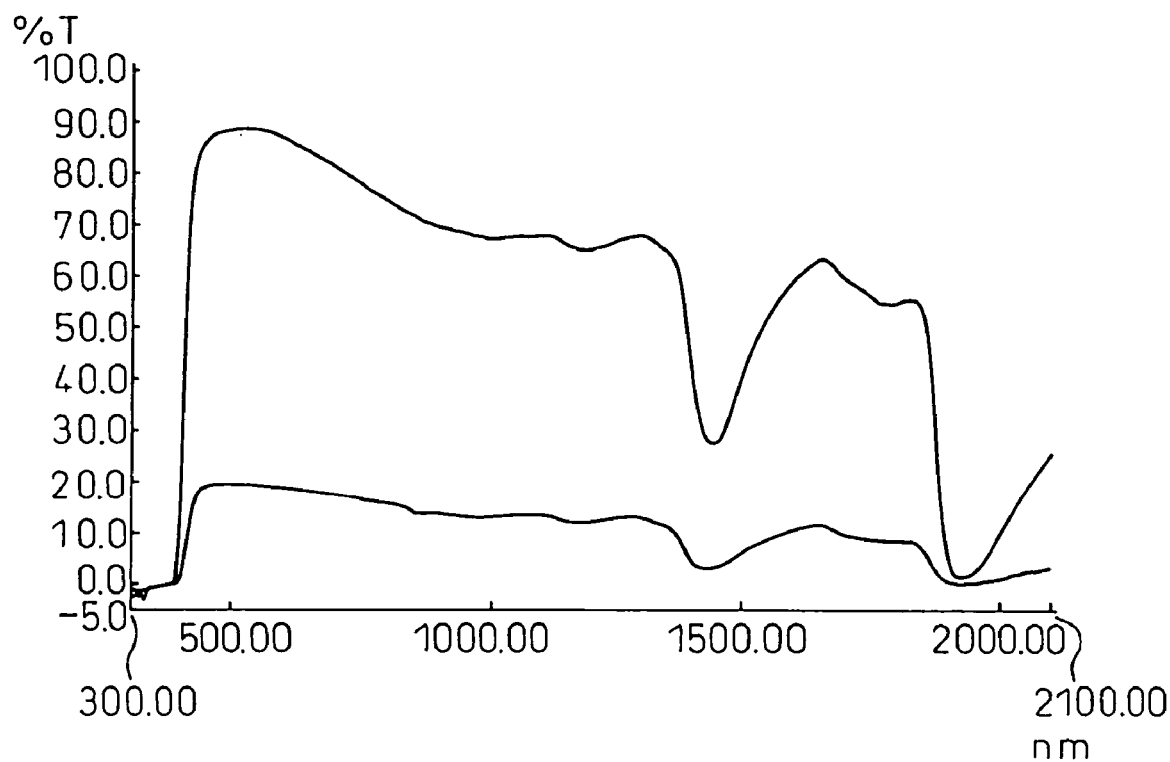
FIG. 4 is a graph showing the change in transmittance of a laminated body of the invention between the transparent state and the opaque state.

Two separate isotropic aqueous solutions (A) and (B) transparent at 20° C. were prepared containing UV-106. Solution (A) was HPC/TP400/UV-106/water/NaCl=50/25/1.25/87/2, and solution (B) was HPC/TP400/UV-106/water=50/25/2.5/87. Solution (A) was colorless and transparent with transmittances of RT: 88.7% and HT: 19.5%. The initial opacity temperature was 30° C. In the UV test, irregular aggregation was seen immediately after continuous irradiation for 200 hours, but there was no generation of air bubbles. The irregular aggregation disappeared naturally after standing at room temperature, and virtually no variation occurred in the initial opacity temperature, such that a satisfactory opaque, light-blocking state was sustained. Solution (B) was colorless and transparent with transmittances of RT: 88.6% and HT: 13.0%. The initial opacity temperature was 41° C. The results of the UV test were similar to those of solution (A). A high degree of weather resistance was therefore confirmed. FIG. 4 shows the transmittance (% T) at 300–2100 nm for the transparent and opaque states of solution (A), for a typical transparent laminated body. This graph demonstrates that ultraviolet rays of up to about 400 nm are adequately absorbed. In order to compare these UV test results against natural light, a laminated body with solution (A) was subjected to an accelerated outdoor light exposure test with natural light (EMMAQUA Test, Arizona, USA) for 6 months, and it exhibited satisfactory results with no particular change. The accelerated exposure test corresponds to approximately 10 years of outdoor exposure in Tokyo, Japan.

EXAMPLE 2

Three separate isotropic aqueous solutions (A), (B) and (C) transparent at 20° C. were prepared containing 2,4-dihydroxybenzophenone (hereinafter, "UV-100"), 2-(2,4-dihydroxyphenyl)-2H-benzotriazole (hereinafter, "UV-7011") and ionic functional group-containing Compound No. 1 mentioned above, respectively. Solution (A) was HPC/TP400/UV-100/water/NaCl=50/50/1.25/85/1.5, solution (B) was HPC/TP400/UV-7011/water=50/50/1.25/85, and solution (C) was HPC/TP400/No. 1/water=50/25/1.25/87. Solution (A) was colorless and transparent with transmittances of RT: 89.0% and HT: 12.5%. The initial opacity temperature was 31° C. The results of the UV test were satisfactory as in Example 1. Solution (B) was colorless and transparent with transmittances of RT: 88.6% and HT: 13.7%. The initial opacity temperature was 42° C. The results of the UV test were satisfactory as in Example 1, although some faint yellowing occurred. Solution (C) was colorless and transparent with htransmittances of RT: 89.0% and HT: 14.7%. The initial opacity temperature was 48° C. The results of the UV test were satisfactory as in Example 1. A high degree of weather resistance was therefore confirmed.

EXAMPLE 3

Seven separate isotropic aqueous solutions (A) to (H) were prepared containing the UV-106, UV-100, UV-7011 and Compound No. 1 used in Examples 1 and 2, as well as a compound obtained by adding three ethylene oxide units to the 4-position hydroxyl of UV-7011 (hereinafter, UV-7011G3). PgH represents phenyl monoglycol, PhG-55 represents phenyl glycol having a polyethylene oxide group and with a hydroxyl value of about 165, BPE-60 represents a substance with a polyethylene oxide group added to bisphenol A and a hydroxyl value of about 228, and Ca-2H represents calcium chloride dihydrate. Solution (A) was HPC/TP400/PhG-55/UV-100/water/Ca-2H=50/22.5/10/2.5/86/5.5, solution (B) was HPC/PhG-55/UV-100/water/Ca-2H=50/15/2/86/10, solution (C) was HPC/TP400/PhG-55/UV-7011/water/NaCl=50/25/5/1.5/87/2.5, solution (D) was HPC/PhG-55/UV-7011G3/water/Ca-2H=50/50/1/86/10, solution (E) was HPC/TP400/No. 1/water/Ca-2H=50/25/1/86/5, solution (F) was HPC/BPE-60/PhG-55/UV-100/water/NaCl=50/20/10/1/87/3.5, solution (G) was HPC/TP400/PhG/UV-100/water/NaCl=50/24/10/1/87/1.5, and solution (H) was HPC/TP400/PhG-55/UV-100/UV-106/water/Ca-2H=50/22.5/10/1.25/1.25/86/5.5. Solution (A) was colorless and transparent with transmittances of RT: 88.5% and HT: 12.4%. The initial opacity temperature was 29° C. The results of the UV test were satisfactory as in Example 1. Solution (B) was colorless and transparent with transmittances of RT: 88.5% and HT: 12.5%. The initial opacity temperature was 19° C. The results of the UV test were satisfactory as in Example 1. Solution (C) was colorless and transparent with transmittances of RT: 88.5% and HT: 12.7%. The initial opacity temperature was 30° C. The results of the UV test were satisfactory as in Example 1, although slight faint yellowing occurred. Solution (D) was colorless and transparent with transmittances of RT: 88.3% and HT: 18.6%. The initial opacity temperature was 37° C. The results of the UV test were satisfactory as in Example 1. Solution (E) was colorless and transparent with transmittances of RT: 88.4% and HT: 13.5%. The initial opacity temperature was 31° C. The results of the UV test were satisfactory as in Example 1. Solution (F) was colorless and transparent in a temperature range of 15° C. to 31° C., with transmittances of RT: 88.6% and HT: 15.6%. It was opaque even at below 15° C. The results of the UV test were satisfactory as in Example 1. Solution (G), due to the action of PhG, exhibited visibility between 18° C. and 29° C. with a light whitish blue semi-transparent state and transmittances of RT: ~70% and HT: 11.7%. The temperature of the initial strong opacity was 29° C. It was also opaque at below 18° C. The results of the UV test were satisfactory as in Example 1. Solution (H) was colorless and transparent with transmittances of RT: 88.5% and HT: 12.1%. The initial opacity temperature was 29° C. The results of the UV test were satisfactory as in Example 1. Incidentally, the opacity change in low temperature ranges with solutions (F) and (G) was observed even when UV-100 was removed, and the change was stably reversible.

COMPARATIVE EXAMPLE

There were prepared two separate isotropic aqueous solutions (A) and (B) containing no ultraviolet absorber and two separate isotropic aqueous solutions (C) and (D) containing Sumisorb 110S (hereinafter, "110S") by Sumitomo Chemical Co., Ltd. Solution (A) was HPC/TP400/water/NaCl=50/25/87/2, solution (B) was HPC/TP400/water=50/25/87, solution (C) was HPC/TP400/110S/water=50/25/2.5/87, and solution (D) was HPC/TP400/110S/water=50/25/1.25/87. Solution (A) contained no ultraviolet absorber and had transmittances of RT: 88.5% and HT: 13.7%. The initial opacity temperature was 34° C. In the UV test, air bubbles were generated after 50 hours producing an irreversible change, while generation of larger air bubbles occurred after 100 hours thereby hampering opaque change, and the state was irreversible. Solution (B) contained no ultraviolet absorber and had transmittances of RT: 88.5% and HT: 13.7%. The initial opacity temperature was 46° C. The results of the UV test were the same as for solution (A). Solution (C) was colorless and transparent with transmittances of RT: 88.0% and HT: 17.2%. The initial opacity temperature was 52° C. In the UV test, the initial opacity temperature increased to 62° C. after 50 hours, while generation of air bubbles occurred after 100 hours thereby hampering opaque change, and the state was irreversible. Solution (D) was colorless and transparent with transmittances of RT: 89.1% and HT: 18.9%. The initial opacity temperature was 49° C. The results of the UV test were the same as for solution (C). Thus, even addition of 110S produced only a slight degree of improvement, leaving an obvious problem for extended use. In order to compare these UV test results against natural light, laminated bodies with solutions (A) and (C) were subjected to the aforementioned EMMAQUA Test for 6 months, and similar to the UV test, an irreversible state was exhibited by both.

INDUSTRIAL APPLICABILITY

According to the present invention, laminated bodies enclosing isotropic aqueous solutions containing selected benzophenone derivatives and benzotriazole derivatives exhibit high weather resistance while stably maintaining uniform reversible changes, and they are therefore practical for such purposes as windows, visors, tiles and the like which are used for long periods under constant exposure to direct light rays from the sun.

The invention claimed is:

1. A laminated body comprising an isotropic aqueous solution obtained by dissolving 100 parts by weight of a water-soluble polysaccharide derivative having a weight-average molecular weight of about 10,000 to about 200,000 and having a nonionic amphipathic functional group, in about 100 to about 2000 parts by weight of an aqueous medium composed of (i) water in an amount of about 25 to about 450 parts by weight with respect to said polysaccharide derivative and an amphipathic substance with a molecular weight of about 60 to about 5000, said isotropic solution being laminated between plates that are partially transparent and allow direct vision of said aqueous solution, wherein there is added in an amount of 0.01–10 parts by weight with respect to 100 parts by weight of said isotropic aqueous solution at least one compound selected from the group consisting of nonionic benzophenone derivatives and benzotriazole derivatives having solubility of 1 g or greater in the amphipathic substance at 20° C. and ionic benzophenone derivatives and benzotriazole derivatives with an ionic functional group bonded to the benzene ring via a chain portion and having solubility of 1 g or greater in water at 20° C.

2. A laminated body according to claim 1, wherein said nonionic benzophenone derivative or benzotriazole derivative has 20° C. solubility of 1 g or greater in the amphipathic substance polyoxypropylene trimethylolpropane having a molecular weight of about 400.

3. A laminated body according to claim 1, wherein said nonionic benzophenone derivative or benzotriazole derivative is a compound represented by formula 1 or 3:

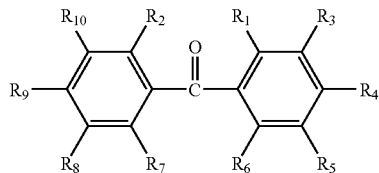

1 wherein $R_1$ and $R_2$ each represent hydrogen or hydroxyl, with at least one of $R_1$ and $R_2$ being hydroxyl, and $R_3$–$R_{10}$ each represent hydrogen, $C_{1-4}$ alkyl, $C_{1-4}$ alkoxy, hydroxyl, polyglycerin, polyethylene oxide or O—$(R_{11})_n$-A where A represents an unprotected sugar residue, and $R_{11}$ represents a direct bond n=0, $C_{1-4}$alkylene or $C_{1-4}$ alkyleneoxide, where n is an integer of 1 to 6, with at least one from among $R_3$ to $R_{10}$ being hydroxyl, polyglycerin, polyethylene oxide or O—$(R_{11})_n$-A;

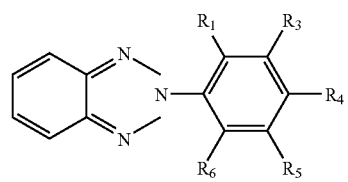

3 wherein $R_1$ represents hydroxyl, and $R_3$–$R_6$ each represent hydrogen, $C_{1-4}$ alkyl, $C_{1-4}$ alkoxy, hydroxyl, polyglycerin, polyethylene oxide or O—$(R_{11})_n$-A where A represents an unprotected sugar residue, and $R_{11}$ represents a direct bond n=0, $C_{1-4}$ alkylene or $C_{1-4}$ alkyleneoxide where n is an integer of 1 to 6, with at least one from among $R_3$ to $R_6$ being hydroxyl, polyglycerin, polyethylene oxide or O—$(R_{11})_n$-A.

4. A laminated body according to claim 1, wherein one from among $R_3$ to $R_6$ and one from among R, to $R_{io}$ are hydroxyl groups.

5. A laminated body according to claim 4, wherein the remaining groups of $R_3$ to $R_6$ and $R_7$ to $R_{10}$ are hydrogen atoms, methoxy groups or ethoxy groups.

6. A laminated body according to claim 1, wherein the ionic functional group is a sulfonic acid group, carboxylic acid group, phosphoric acid group or ammonium group.

7. A laminated body according to claim 1, wherein a temperature shifting agent is further added to said isotropic aqueous solution.

8. A laminated body according to claim 1, wherein two or more different isotropic aqueous solution layers are provided.

9. A laminated body according to claim 1, wherein an additional substrate is situated on at least one side to provide a gas layer.

10. A window containing a laminated body which comprises an isotropic aqueous solution obtained by dissolving 100 parts by weight of a water-soluble polysaccharide derivative having a weight-average molecular weight of about 10,000 to about 200,000 and having a nonionic amphipathic functional group, in about 100 to about 2000 parts by weight of an aqueous medium composed of (i) water in an amount of about 25 to about 450 parts by weight with respect to said polysaccharide derivative and (ii) an amphipathic substance with a molecular weight of about 60 to about 5000, said isotropic solution being laminated between plates that are partially transparent and allow direct vision of said aqueous solution, wherein there is added in an amount of 0.01–10 parts by weight with respect to 100 parts by weight of said isotropic aqueous solution at least one compound selected from the group consisting of nonionic benzophenone derivatives and benzotriazole derivatives having solubility of 1 g or greater in the amphipathic substance at 20° C. and ionic benzophenone derivatives and benzotriazole derivatives with an ionic functional group bonded to the benzene ring via a chain portion and having solubility of 1 g or greater in water at 20° C.

11. A window according to claim 10, wherein said nonionic benzophenone derivative or benzotriazole derivative has 20° C. solubility of 1 g or greater in the amphipathic substance polyoxypropylene trimethylolpropane having a molecular weight of about 400.

12. A window according to claim 10, wherein said nonionic benzophenone derivative or benzotriazole derivative is a compound represented by the following general formula 1 or 3

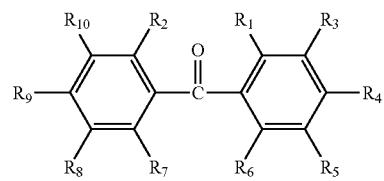

1 wherein $R_1$ and $R_2$ each represent hydrogen or hydroxyl, with at least one of $R_1$ and $R_2$ being hydroxyl, and $R_3$–$R_{10}$ each represent hydrogen, $C_{1-4}$, alkyl, $C_{1-4}$, alkoxy, hydroxyl, polyglycerin, polyethylene oxide or O—$(R_{11})_n$-A where A represents an unprotected sugar residue, and $R_{11}$ represents a direct bond n=0, $C_{1-4}$, alkylene or $C_{1-4}$, alkyleneoxide where n is an integer of 1 to 6, with at least one from among $R_3$ to $R_{10}$ being hydroxyl, polyglycerin, polyethylene oxide or O—$(R_{11})_n$-A;

(wherein $R_1$ represents hydroxyl, and $R_3$–$R_6$ each represent hydrogen, $C_{1-4}$, alkyl $C_{1-4}$, alkoxy, hydroxyl, polyglycerin, polyethylene oxide or O—$(R_{11})_n$-A; where A represents an unprotected sugar residue,

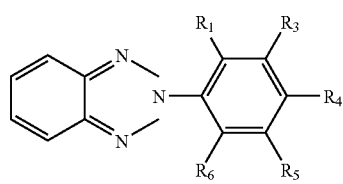

3 and $R_{11}$ represents a direct bond n=0, $C_{1-4}$, alkylene or $C_{1-4}$, alkyleneoxide where n is an integer of 1 to 6, with at least one from among $R_3$ to $R_6$ being hydroxyl, polyglycerin, polyethylene oxide or O—$(R_{11})_n$-A.

13. A window according to claim 10, wherein one from among $R_3$ to $R_6$ and one from among $R_7$ to $R_{10}$ are hydroxyl groups.

14. A window according to claim 13, wherein the remaining groups of $R_3$ to $R_6$ and $R_7$ to $R_{10}$ are hydrogen atoms, methoxy groups or ethoxy groups.

15. A window according to claim 10, wherein the ionic functional group is a sulfonic acid group, carboxylic acid group, phosphoric acid group or ammonium group.

16. A window according to claim 10, wherein a temperature shifting agent is further added to said isotropic aqueous solution.

17. A window according to claim 10, wherein two or more different isotropic aqueous solution layers are provided.

18. A window according to claim 10, wherein an additional substrate is situated on at least one side to provide a gas layer.

* * * * *

UNITED STATES PATENT AND TRADEMARK OFFICE
CERTIFICATE OF CORRECTION

PATENT NO. : 7,163,726 B2
APPLICATION NO. : 10/484171
DATED : January 16, 2007
INVENTOR(S) : Haruo Watanabe It is certified that error appears in the above-identified patent and that said Letters Patent is hereby corrected as shown below:

Column 17, line 42, reads "R, to $R_{io}$" should read -- $R_7$ to $R_{10}$ --
Column 18, line 40, reads "$C_{1-4}$, alkyl, $C_{1-4}$, alkoxy," should read -- $C_{1-4}$ alkyl, $C_{1-4}$ alkoxy, --
Column 18, line 43, reads "$C_{1-4}$, alkylene or $C_{1-4}$, alkyleneoxide," should read -- $C_{1-4}$ alkylene or $C_{1-4}$ alkyleneoxide, --
Column 18, line 47, reads "(wherein" should read -- wherein --
Column 18, line 48, reads "$C_{1-4}$, alkyl $C_{1-4}$, alkoxy," should read -- $C_{1-4}$ alkyl, $C_{1-4}$ alkoxy, --
Column 18, line 64, reads "$C_{1-4}$, alkylene or $C_{1-4}$," should read -- $C_{1-4}$ alkylene or $C_{1-4}$ --

Signed and Sealed this

Twenty-ninth Day of April, 2008

JON W. DUDAS
*Director of the United States Patent and Trademark Office*